(12) United States Patent
Campagnan et al.

(10) Patent No.: US 9,871,827 B2
(45) Date of Patent: *Jan. 16, 2018

(54) SYSTEM AND METHOD OF LAWFUL ACCESS TO SECURE COMMUNICATIONS

(71) Applicants: BlackBerry Limited, Waterloo (CA); Certicom Corp., Mississauga (CA)

(72) Inventors: Matthew John Campagnan, Ridgefield, CT (US); Gregory Marc Zaverucha, Redmond, WA (US); Michael Eoin Buckley, Rolling Meadows, IL (US)

(73) Assignees: BlackBerry Limited, Waterloo, ON (CA); Certicom Corp., Mississauga, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,543

(22) Filed: Aug. 1, 2016

(65) Prior Publication Data
US 2016/0344775 A1 Nov. 24, 2016

Related U.S. Application Data

(63) Continuation of application No. 13/739,620, filed on Jan. 11, 2013, now Pat. No. 9,413,530.
(Continued)

(51) Int. Cl.
*H04L 9/00* (2006.01)
*H04L 29/06* (2006.01)
*H04L 9/08* (2006.01)

(52) U.S. Cl.
CPC .......... *H04L 63/306* (2013.01); *H04L 9/0861* (2013.01); *H04L 2209/80* (2013.01)

(58) Field of Classification Search
None
See application file for complete search history.

(56) References Cited

U.S. PATENT DOCUMENTS 6,823,185 B1 * 11/2004 Comer ............... H04B 7/185
                                           379/213.01
7,382,881 B2    6/2008 Uusitalo et al.
(Continued)

FOREIGN PATENT DOCUMENTS

EP          2472769       7/2012
WO     2007/023286     3/2007
(Continued)

OTHER PUBLICATIONS

3GPP TS 33.108 V11.1.0; 3rd Generation Partnership Project; Technical Specification Group Services and System Aspects; 3G Security; Handover Interface for Lawful Interception (LI) (Release 11); Sep. 2011; 194 pages.
(Continued)

*Primary Examiner* — Lisa Lewis
*Assistant Examiner* — Olanrewaju Bucknor
(74) *Attorney, Agent, or Firm* — Fish & Richardson P.C.

(57) ABSTRACT

The present disclosure relates to systems and methods for secure communications. In some aspects, a method of signalling an interception time period is described. At least one keying information used by a KMF to regenerate a key is stored. A start_interception message is signaled from an ADMF to a CSCF. A halt_message is signaled from the ADMF to the CSCF.

17 Claims, 12 Drawing Sheets

Related U.S. Application Data

(60) Provisional application No. 61/622,854, filed on Apr. 11, 2012, provisional application No. 61/586,074, filed on Jan. 12, 2012.

(56) References Cited

U.S. PATENT DOCUMENTS

| | | | |
|---|---|---|---|
| 8,218,456 B2 | 7/2012 | Yared | |
| 8,400,927 B2 | 3/2013 | Attanasio et al. | |
| 8,448,235 B2* | 5/2013 | Langham | H04L 9/0838 713/168 |
| 8,477,730 B2 | 7/2013 | Rajagopalan | |
| 8,549,614 B2* | 10/2013 | Kumar | H04L 63/18 726/14 |
| 8,625,787 B2 | 1/2014 | Brusilovsky et al. | |
| 8,769,288 B2* | 7/2014 | Sundaram | H04L 9/0894 380/277 |
| 8,792,505 B2 | 7/2014 | Iovieno | |
| 8,837,737 B2* | 9/2014 | Blom | H04L 9/083 380/281 |
| 9,143,321 B2* | 9/2015 | Senese | H04L 9/0822 |
| 2002/0049913 A1* | 4/2002 | Lumme | H04L 63/30 726/13 |
| 2002/0078384 A1* | 6/2002 | Hippelainen | H04L 12/2602 726/13 |
| 2003/0200433 A1* | 10/2003 | Stirbu | H04L 9/0844 713/169 |
| 2004/0228362 A1 | 11/2004 | Maki | |
| 2005/0063544 A1 | 3/2005 | Uusitalo et al. | |
| 2005/0149732 A1* | 7/2005 | Freeman | H04L 29/06 713/171 |
| 2005/0152275 A1* | 7/2005 | Laurila | H04L 43/18 370/241 |
| 2005/0254656 A1 | 11/2005 | Rose et al. | |
| 2006/0037041 A1 | 2/2006 | Zhang | |
| 2007/0237144 A1 | 10/2007 | Adhikari et al. | |
| 2007/0297418 A1 | 12/2007 | Lee | |
| 2008/0267395 A1 | 10/2008 | Deishi | |
| 2008/0279705 A1 | 11/2008 | Wago et al. | |
| 2009/0129271 A1 | 5/2009 | Ramankutty et al. | |
| 2009/0207751 A1 | 8/2009 | Attanasio et al. | |
| 2009/0220091 A1 | 9/2009 | Howard | |
| 2009/0279705 A1 | 11/2009 | Sun et al. | |
| 2010/0185852 A1 | 7/2010 | Ogawa et al. | |
| 2010/0205448 A1 | 8/2010 | Tarhan et al. | |
| 2010/0260141 A1 | 10/2010 | Chowdhury et al. | |
| 2010/0262472 A1 | 10/2010 | Gautam et al. | |
| 2010/0268937 A1 | 10/2010 | Blom et al. | |
| 2011/0032840 A1* | 2/2011 | Di Donato | H04L 12/2602 370/252 |
| 2011/0044326 A1 | 2/2011 | Tasker et al. | |
| 2011/0055567 A1 | 3/2011 | Sundaram et al. | |
| 2011/0075675 A1 | 3/2011 | Koodli et al. | |
| 2011/0078281 A1* | 3/2011 | Imbimbo | H04W 12/02 709/217 |
| 2011/0107082 A1 | 5/2011 | Blom et al. | |
| 2011/0134804 A1 | 6/2011 | Maes | |
| 2011/0141947 A1 | 6/2011 | Li et al. | |
| 2011/0170411 A1 | 7/2011 | Wang | |
| 2011/0170694 A1 | 7/2011 | Brusilovsky et al. | |
| 2011/0206205 A1 | 8/2011 | Seleznev et al. | |
| 2011/0213958 A1 | 9/2011 | Lindholm et al. | |
| 2012/0066496 A1 | 3/2012 | Blom et al. | |
| 2012/0207284 A1 | 8/2012 | Tian et al. | |
| 2012/0254403 A1 | 10/2012 | Imbimbo et al. | |
| 2012/0288092 A1 | 11/2012 | Cakulev et al. | |
| 2013/0182840 A1 | 7/2013 | Campagna et al. | |
| 2013/0182841 A1 | 7/2013 | Campagna et al. | |
| 2013/0182843 A1 | 7/2013 | Campagna et al. | |
| 2013/0286869 A1* | 10/2013 | Woelker | H04L 63/30 370/252 |
| 2013/0288652 A1 | 10/2013 | Ciriaco | |
| 2013/0326631 A1* | 12/2013 | Cartmell | H04L 63/306 726/26 |
| 2015/0074396 A1* | 3/2015 | Naslund | H04L 63/0807 713/168 |

FOREIGN PATENT DOCUMENTS

| | | |
|---|---|---|
| WO | 2010/145233 | 12/2010 |
| WO | 2011/031439 | 3/2011 |
| WO | 2011/087989 | 7/2011 |
| WO | 2011/131070 | 10/2011 |

OTHER PUBLICATIONS

Alcatel-Lucent; "MIKEY-IBAKE and LI Requirements": Power Point; .2010; 12 pages.
Alcatel-Lucent; "MIKEY-IBAKE and LI"; 3GPP TSG-SA3LI, SA3#41LI;SA3L111_067; May 10-12, 2011; Philadelphia, US; 6 pages.
Alcatel-Lucent; "MIKEY-IBAKE and LI Approaches"; SA3LI11_098; Power Point; 2010; 10 pages.
Alcatel-Lucent; "MIKEY-IBAKE and LI—Open Issues"; Power Point; 2010; 7 pages.
Alcatel-Lucent; "Pseudo-Random Number Generator LI approach for MIKEY-IBAKE"; 3GPP TSG-SA3LI, SA3#42LI; SA3LI11_100; Aug. 30-Sep. 1, 2011; Malta; 3 pages.
Alcatel Lucent, Rogers Wireless; "Proposed Table of Contents for the Living Document on LI Solutions for IMS Media Plane Security Based on MIKEY-IBAKE"; 3GPP TSG-SA3LI, SA3#43LI; SA3LI11_124; Nov. 15-17, 2011; San Francisco, California; 3 pages.
Baugher et al.; "The Secure Real-Time Transport Protocol (SRTP)"; RFC3711; Network Working Group; Mar. 2004; 57 pages.
Mattsson et al.; "MIKEY-Ticket: Ticket-Based Modes of Key Distribution in Multimedia Internet KEYing (MIKEY)"; RFC 6043; Internet Engineering Task Force (IEFT); Mar. 3, 2011; 59 pages.
McGrew et al.; "Encrypted Key Transport for Secure RTP"; Internet-Draft; Network Working Group; Oct. 26, 2009; 45 pages.
3GPP TS 33.107, v11.0.0, "Technical Specification Group Services and System Aspects, 3G Security; Lawful interception architecture and functions," Release 11, Sep. 2011, 136 pages.
3GPP TS 33.106, v11.1.0, "Technical Specification Group Services and System Aspects, 3G security, Lawful interception requirements," Release 11, Sep. 26, 2011, 17 pages.
3GPP TSG-SA3LI, SA3#41LI, SA3L111_083, "MIKEY-IBAKE for LI," May 10-12, 2011; 6 pages.
3GPP TS 33.328, v9.2.0, "Universal Mobile Telecommunications System (UMTS); LTE; IP Multimedia Subsystem (IMS) Media Plane Security," Release 9; Jul. 2010; 44 pages.
Mattson, J.; Ericsson; Tian; "MIKEY-Ticket: An Additional Mode of Key Distribution in Multimedia Internet KEYing (MIKEY)," draft-mattsson-m1key-t1cket-03, Apr. 8, 2010, ZTE; 55 pages.
International Search Report and Written Opinion issued in International Application No. PCT/CA2013/050013 dated Apr. 9, 2013; 8 pages.
International Search Report and Written Opinion issued in international Application No. PCT/CA2013/050014 dated Mar. 27, 2013; 11 pages.
International Search Report and Written Opinion issued in International Application No. PCT/CA2013/050015 dated Apr. 17, 2013; 9 pages.
Extended European Search Report in European Application No. 13735922.0, dated Aug. 21, 2015, 6 pages.
Extended European Search Report In European Application No. 13736421.2, dated Aug. 19, 2015, 7 pages.
Extended European Search Report in European Application No. 13736112.7, dated Aug. 20, 2015, 5 pages.
Communication Pursuant to Article 94(3) issued in European Application No. 13736421.2, dated Jun. 30, 2.016.

* cited by examiner

SYSTEM AND METHOD OF LAWFUL ACCESS TO SECURE COMMUNICATIONS

CROSS-REFERENCE TO RELATED APPLICATIONS

This application is a continuation of and claims priority to U.S. patent application Ser. No. 13/739,620, filed Jan. 11, 2013, which claims priority to U.S. Provisional Application No. 61/586,074 entitled "System and Method of Lawful Access to Secure Communications," filed on Jan. 12, 2012, and to U.S. Provisional Application No. 61/622,854 entitled "System and Method of Lawful Access to Secure Communications," filed on Apr. 11, 2012; the entire contents of both priority applications are hereby incorporated by reference.

BACKGROUND

Lawful interception (LI) requirements for encrypted services such as enhanced internet protocol (IP) multimedia subsystem (IMS) Media Security are detailed in Section 5.7 of Third Generation Partnership Project (3GPP) Technical Specification (TS) 33.106. In one requirement, interception shall be performed in such a manner as to avoid detectability by the target or others. In another requirement, an encryption solution shall not prohibit commencement of interception and decryption of an existing communication.

In the Multimedia Internet KEYing Ticket (MIKEY-TICKET) key exchange protocol, an initiator user equipment (UE) generates a random number RANDRi which is included as a field in a REQUEST_INIT message (i.e., a ticket request message) sent to a key management service (KMS). Also included in the REQUEST_INIT message is the crypto session identity (CS ID) contained in the common header payload (HDR) field. In one implementation of the MIKEY-TICKET protocol, the KMS returns to the initiator UE a traffic encryption key (TEK) for secure communication with a responder UE. In another implementation of the MIKEY-TICKET protocol, the KMS returns to the initiator UE a generating key that is to be used in the generation of the TEK for secure communication with a responder UE. The generating key is called a TEK generation key (TGK) and may be contained in the key data transport payload (KEMAC) field portion of the REQUEST_RESP message from the KMS to the initiator UE. The RANDRi value together with the CS ID and the TGK are used in some implementations by the initiator UE and by a responder UE to generate the TEK used for ciphering in secure realtime transport protocol (SRTP) communication between the initiator UE and the responder UE.

Keying information such as RANDRi, CS ID, TGK and TEK is discarded by the KMS when replying to the initiator UE. As such, information to regenerate the TEK for lawful interception is discarded by, and becomes unavailable to, the KMS. Therefore, mid-call interception of MIKEY-TICKET TEK based SRTP communications between the initiator UE and the responder UE is currently possible only through re-keying. Unfortunately, re-keying is detectable by both the initiator UE and the responder UE, thereby breaking the lawful interception requirements listed above.

BRIEF DESCRIPTION OF THE DRAWINGS

Embodiments will now be described by way of example only, with reference to the attached drawings in which.

DETAILED DESCRIPTION

Figure 1:
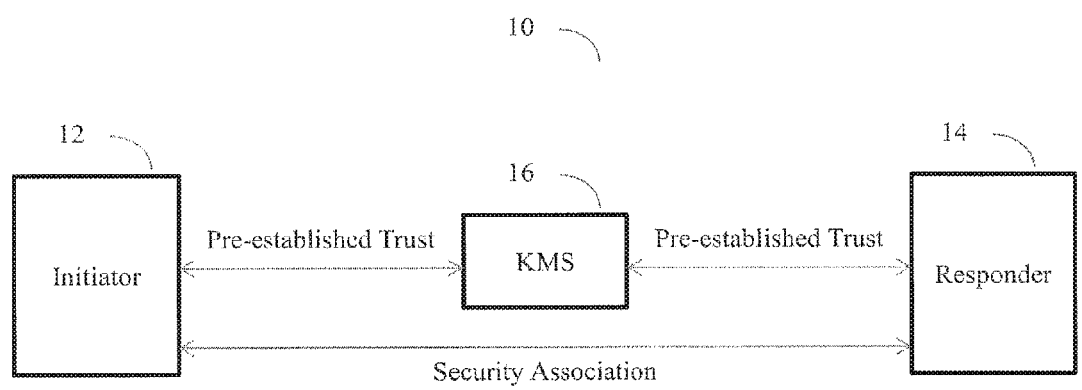
FIG. 1 illustrates an example of a trust model 10, in association with the MIKEY-TICKET key exchange protocol.

In accordance with one aspect of the present disclosure, there is provided a method of signalling an interception time period. The method comprises storing at least one keying information used by a KMF to regenerate a key, signalling a start_interception message from an ADMF to a CSCF and signalling a halt_message from the ADMF to the CSCF. In accordance with another aspect of the present disclosure, there is provided a network comprising one or more servers for performing the method of signalling an interception time period.

In accordance with another aspect of the present disclosure, there is provided a method of decrypting an intercepted message. The method comprises receiving one or more values used in generation of an encryption key, storing the one or more values used by a KMF to regenerate the encryption key; generating the encryption key using the one or more values, signalling a start_interception message to a CSCF, decrypting intercepted packets and signalling a halt-_message from an ADMF to the CSCF. In accordance with another aspect of the present disclosure, there is provided a network comprising one or more servers for performing the method of decrypting an intercepted message.

In accordance with another aspect of the present disclosure, there is provided a method for regenerating an encryption key. The method comprises receiving one or more values used in generation of an encryption key, storing at least one of the one or more values in a repository and generating the encryption key using the one or more values, including obtaining at least one of the stored values from the repository. In accordance with another aspect of the present disclosure, there is provided a network comprising one or more servers for performing the method for regenerating an encryption key.

A system and method of lawful access to secure communication is provided. In the following description, for the purposes of explanation, specific details are set forth in order to provide a thorough understanding of the present disclosure. It will be apparent, however, to one skilled in the art that the technique may be practiced without these specific details. In other instances, well-known structures and devices are shown in block diagram form in order to avoid unnecessarily obscuring the present disclosure.

Some of the needs identified in the foregoing Background, and other needs and objects that will become apparent from the following description, are achieved by, in one aspect, a system and method of lawful access to secure communication. In other aspects, the disclosure encompasses apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files, etc. In particular, the method may be implemented in a mobile telecommunications device, with or without voice capabilities, or other electronic devices such as handheld or portable devices.

In overview, existing problems are overcome according to the approaches described below. In the diagram of FIG. 1 and consequent figures, like reference numerals denote like components/messages and are not described unless repetition is required.

A law enforcement agency (LEA) may sometimes require the interception of communications between parties when one or more of the parties are a target under investigation. Unfortunately, when an electronic communication is secured using encryption, the LEA does not have easy access to the communication.

Lawful interception requirements for encrypted services such as enhanced IMS media security are detailed in section 5.7 of Third Generation Partnership Project (3GPP) technical specification (TS) 33.106. In one requirement of lawful interception, interception should be performed in a manner that avoids detectability by a target or by others. In particular, there should not be a significant difference in latency during call setup or during communications compared to a non-intercepted communication. Also, interception of a target should not prevent the use of key exchange applications which provide a user key confirmation mechanism. In another requirement of lawful interception, an encryption solution should not prohibit commencement of interception and decryption of an existing communication.

One type of key exchange protocol in use today is the Multimedia Internet KEYing Ticket (MIKEY-TICKET) key exchange protocol. FIG. 1 illustrates an example of a trust model 10, in association with the MIKEY-TICKET key exchange protocol. In the MIKEY-TICKET key exchange protocol, an initiator 12 wishes to communicate with a responder 14. Both the initiator 12 and the responder 14 have pre-established trust relationships with a trusted third party, the key management service (KMS) 16. In some instances, this includes a secure channel between the UE (of the initiator 12 or responder 14) and KMS 16, which may be facilitated with a shared key (the shared key is used to encrypt and authenticate communications using a symmetric key encryption algorithm). The pre-established trust relationships may be used to establish a security association between the initiator 12 and the responder 14. The trust model 10 may be modified to include a plurality of responders (i.e., a group of parties) and a plurality of KMS (i.e., one KMS for each responder or groupings of responders).

Initiators 12 and responders 14 may be any party wishing to communicate securely, including via electronic devices. In the following description, initiators 12 and responders 14 are described from the view of user equipment (UE) and are referred to as initiator UEs 12 and responder UEs 14.

Figure 2:
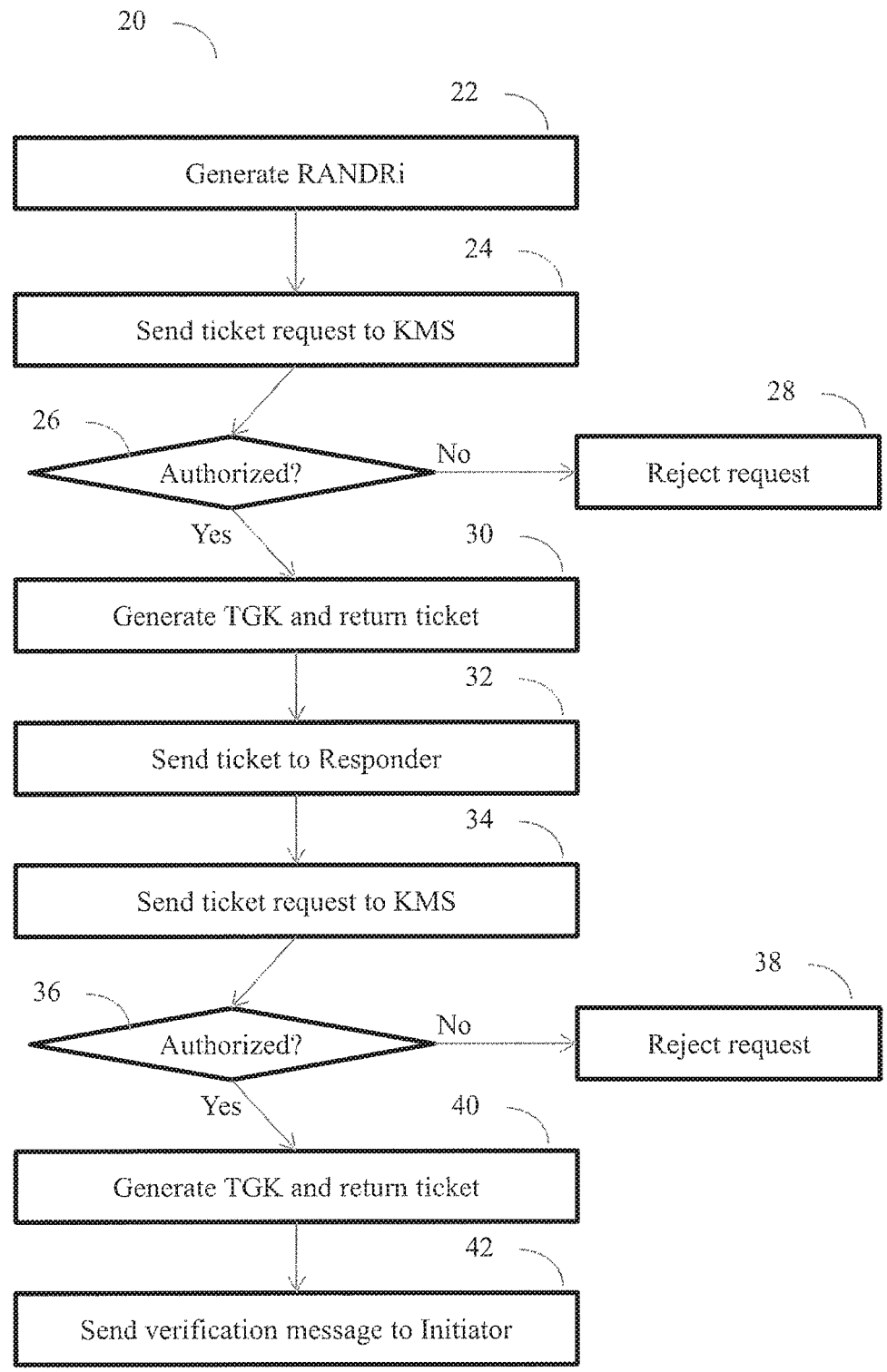
FIG. 2 illustrates in a flow diagram, an example of a method of key generation, in accordance with the MIKEY-TICKET key exchange protocol.

FIG. 2 illustrates in a flow diagram, an example of a method of key generation (20), in accordance with the MIKEY-TICKET key exchange protocol. The method (20) comprises an initiator UE 12 generating a random number (22), RANDRi, which is included in a field in a REQUEST_INIT message (i.e., a ticket request message) to be sent to the KMS 16. Also included in the REQUEST_INIT message is the CS ID. The initiator UE 12 sends a ticket request (24), i.e., by transmitting a REQUEST_INIT message, to the KMS 16. The ticket request includes session information, such as the identities of authorized responders, that is integrity protected via a message authentication code (MAC) based on the pre-existing trust relationship between the initiator UE 12 and the KMS 16. One or more keys for one or more parties may be requested in the ticket request. If the request is not authorized (26), the KMS 16 rejects the request (28). If the request is authorized (26), the KMS 16 generates the requested one or more TGK keys, encodes the keys in a ticket and/or key data transport payload (KEMAC), and returns the ticket and/or KEMAC (30), i.e., by transmitting a REQUEST_RESP message, to the initiator UE 12. Each key in the one or more keys generated in this step may be used to generate a Traffic Encryption Key (TEK) for secure communication with a responder UE 14. A generating key is called a TEK Generation Key (TGK).

The initiator UE 12 next sends the ticket, RANDRi, and CS ID to a responder UE 14 (32) by transmitting a TRANSFER_INIT message to the responder UE 14. The TRANSFER_INIT message is encoded using a MAC based on the TGK. Once receiving the ticket, the responder UE 14 sends the ticket, by transmitting a RESOLVE_INIT message, to the KMS 16 (34) to obtain the relevant TGK. The RESOLVE_INIT message is protected via a MAC based on the pre-existing trust relationship between the responder UE 14 and the KMS 16. If the responder UE 14 is not authorized to receive the TGK (36), the KMS 16 rejects the request (38). If the responder UE 14 is authorized to receive the TGK (36) encoded in the ticket, the KMS 16 resolves the ticket and sends to the responder UE 14 the TGK in the KEMAC field of the RESOLVE_RESP message (40), enabling the responder to generate the TEK. The responder UE 14 then sends a verification message (42), by transmitting a TRANSFER_RESP message, to the initiator UE 12. The method (20) is complete and both the initiator UE 12 and responder UE 14 have the shared TEK.

Figure 3:
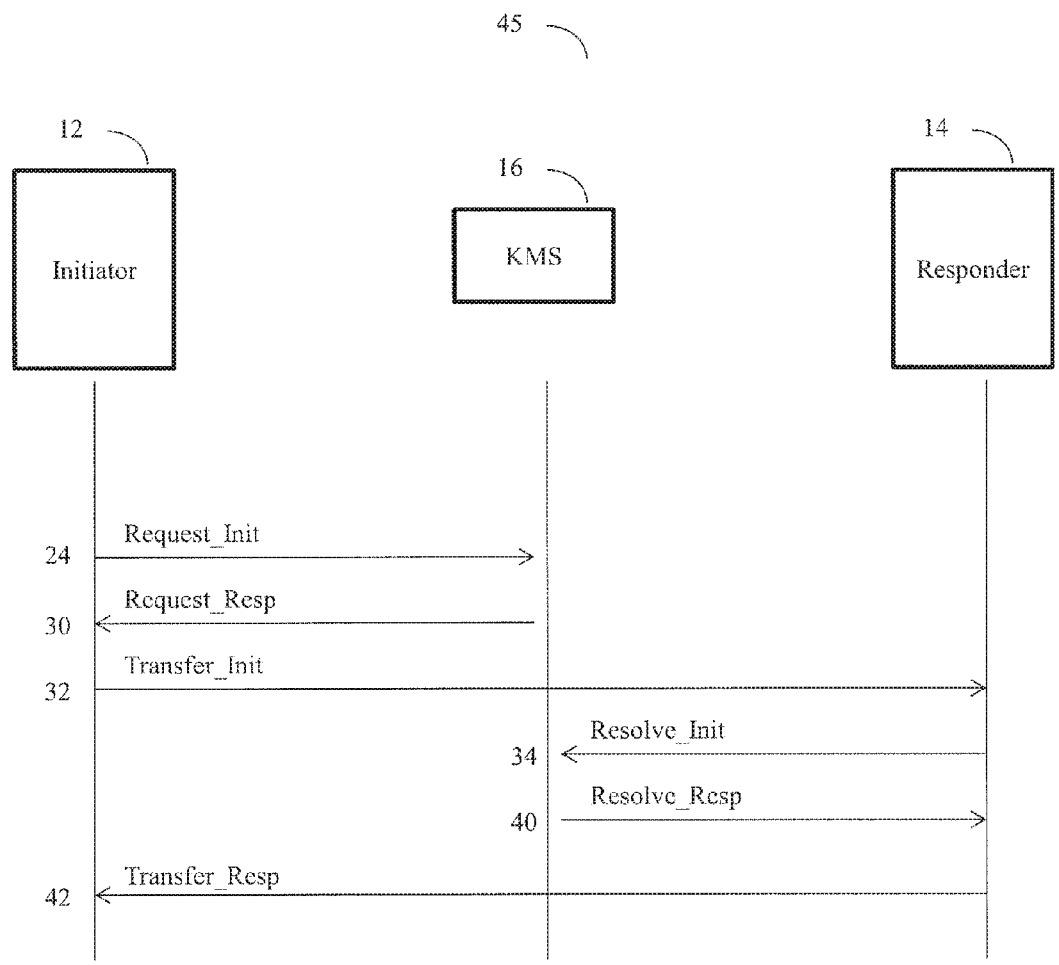
FIG. 3 illustrates in a message flow diagram, an example of a key exchange between an initiator UE and a responder UE, in accordance with the MIKEY-Ticket protocol.

FIG. 3 illustrates in a message flow diagram, an example of a key exchange (45) between an initiator UE 12 and a responder UE 14, in accordance with the MIKEY-TICKET protocol. The initiator UE 12 transmits the REQUEST_INIT message to the KMS 16 (24). The KMS transmits the REQUEST_RESP to the initiator UE 12 (30). The initiator UE 12 transmits the TRANSFER_INIT message to the responder UE 14 (32). The responder UE 14 transmits the RESOLVE_INIT message to the KMS 16 (34). The KMS 16 transmits the RESOLVE_RESP to the responder UE 14 (40). The responder UE 14 transmits the TRANSFER_RESP message to the initiator UE 12 (42).

The RANDRi value together with a CS ID and the TGK can be used by the initiator UE 12 and by the responder UE 14 to generate the TEK used for ciphering in Secure Real-time Transport Protocol (SRTP) communication between the initiator UE 12 and a responder UE 14. The SRTP includes a process for re-keying, i.e., generating a new TEK, including through the regeneration of the TGK via the MIKEY-TICKET protocol. It is understood that the use of any form of the term "regenerate" in the present disclosure can be interchanged with the equivalent form of the term "generate", such that the teachings relating to "regeneration" of a key apply to an initial "generation" of that key. Similarly, the use of any form of the term "generate" in the present disclosure can be interchanged with the equivalent form of the term "regenerate" such that the teachings relating to "generation" of a key apply to a subsequent "regeneration" of that key.

Typically, the CS ID, RANDRi and TGK information is discarded by the KMS 16 when replying to the initiator UE 12. As such, information to regenerate the TEK for lawful interception is discarded by, and becomes unavailable to, the KMS 16. Therefore, mid-call interception of MIKEY-TICKET TEK based SRTP communications between the initiator UE 12 and the responder UE 14 is currently possible only through re-keying.

Unfortunately, re-keying is detectable by both the initiator UE 12 and the responder UE 14, thereby breaking the lawful interception requirements listed above. Furthermore, an alternative of storing in the KMS 16 the information required for lawful intercept re-keying may not be a practical solution for a KMS 16 where there may be a high volume of ticket requests, and when combined with the fact that the duration of a session may be unknown or indefinite. Moreover, the CS ID shared in the TRANSFER_INIT and TRANSFER_RESP message would also need to be stored in the KMS 16.

Figure 4:
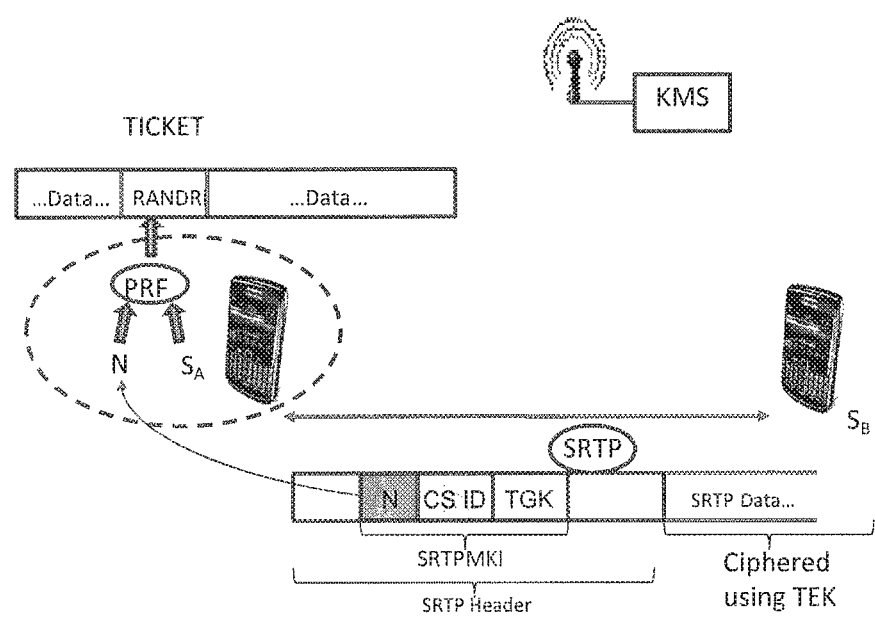
FIG. 4 illustrates one approach to enabling lawful interception for MIKEY-TICKET key exchange in enhanced IMS media security, in accordance with an embodiment of the present disclosure.

FIG. 4 illustrates one approach to enabling full lawful interception for MIKEY-TICKET key exchange in enhanced IMS media security, in accordance with an embodiment of the present disclosure. Each UE 12, 14 is assigned a unique secret key $S_A$, $S_B$, respectively, that are stored in a secure database only accessible by the KMS 16. The secret key $S_A$ stored in the secure database accessibly by the KMS 16, along with a nonce value N that could be contained in every SRTP packet header, is used to regenerate the RANDRi value contained in a TICKET.

One possible field that can be used for this purpose is the SRTP Master Key Identifier (MKI) field in the SRTP Header. While currently an optional field it can be made a requirement as an example for services utilizing enhanced IMS media plane security. As shown in FIG. 4, other values that can be stored in the SRTP MKI field include the CS ID and the TGK; completing the information needed by the KMS 16 to regenerate the TEK. Although the SRTP Header is transmitted openly, the nonce N, CS ID and TGK can be encrypted with the encryption approach used for the initiator UE 12 MIKEY-TICKET request before insertion in the SRTP MKI which is known to the KMS 16. Advantageously, even if the SRTP MKI field is decrypted by an attacker, secrecy is maintained as the secret key $S_A$ remains unknown.

In the case of lawful interception, the LEA observes the SRTP communication at any time, extracts the MKI field from the header of a SRTP packet, and communicates at least the SRTP MKI field to the KMS 16. Since the KMS 16 is given the SRTP MKI field and has the secret key $S_A$ stored, the original RANDRi, CS ID and TGK values, and subsequently the SRTP session key TEK, can be regenerated. The KMS 16 could decrypt the SRTP MKI field to obtain the information required to regenerate the TEK. A bit value may also be included in the MKI field that identifies the initiator UE 12 from the parties involved in the communication of the STRP packet. For example, one of the values of zero (0) or one (1) could represent that the sender (or alternatively the recipient) of the STRP packet is the initiator 12. Thus, the KMS 16 would then be able to identify the correct secret key $S_A$ of the initiator 12 that is stored in the repository of the KMS 16. The bit value is one possible way of identifying the initiator 12. Other ways may also be used.

Figure 5:
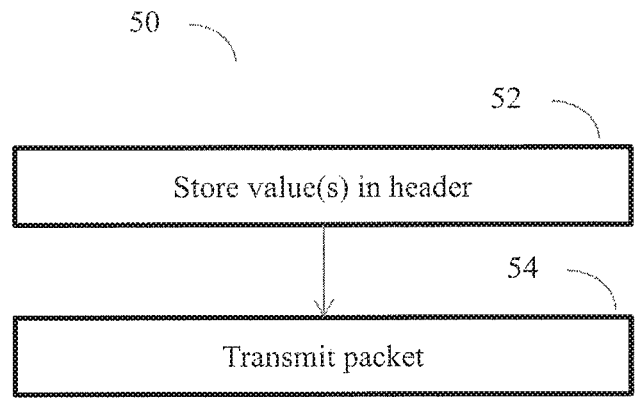
FIG. 5 illustrates in a flow diagram, an example of a method of providing lawful interception information, in accordance with an embodiment of the present disclosure.

FIG. 5 illustrates in a flow diagram, an example of a method of providing lawful interception information (50), in accordance with an embodiment of the present disclosure. The method (50) comprises storing in a header of a packet one or more values used in generation of an encryption key used to encrypt the packet (52). The packet is then transmitted in a communication (54). The at least the data portion of the packet may also be encrypted using the encryption key prior to transmission in the communication. This method is performed by both initiator UEs 12 and responder UEs 14 on all packets in communications subsequent to obtain the TEK. Portions of the packet other than the data portion may be unencrypted or encrypted using the same or another key.

The communications may be SRTP communications where the packet is a SRTP packet, the header is an SRTP header and the one or more values are stored in a SRTP MKI field of the SRTP header. The one or more values may include a nonce value, a CS ID and a TGK. The nonce value, together with a secret key $S_A$, is used by an initiator UE 12 to generate the RANDRi sent to the KMS 16 in the REQUEST_INIT message (24). The TGK is the key provided by the KMS 16 in the REQUEST_RESP message (30) and used by both the initiator UE 12 and responder UE 14, to generate the encryption key TEK.

Advantageously, the MIKEY-TICKET key exchange protocol is enhanced to meet the mid-call interception requirement. The reuse of the SRTP MKI field from the SRTP Header which along with a UE specific secret $S_A$ can be used to enable lawful intercept.

Figure 6:
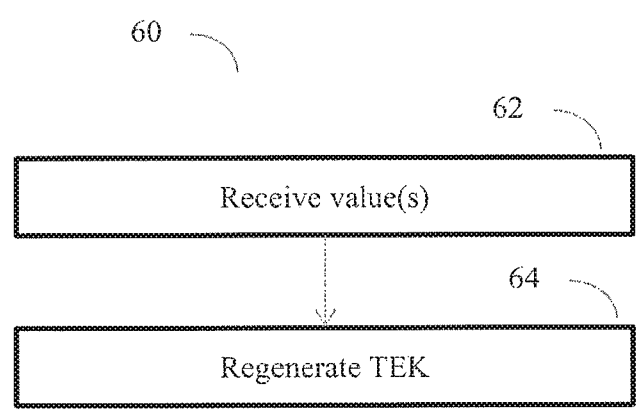
FIG. 6 shows in a flow diagram an example of method for key regeneration, in accordance with an embodiment of the present disclosure.

FIG. 6 shows in a flow diagram an example of method for key regeneration (60), in accordance with an embodiment of the present disclosure. The method (60) comprises obtaining one or more values used in generation of an encryption key (62). The one or more values are then used to regenerate the encryption key (64). Other steps may be added to the method (60) including receiving a SRTP packet and parsing a SRTP MKI field from the SRTP packet to obtain the one or more values. The method (60) may be performed by a KMS 16 in response to a request for the regeneration of a TEK by a law enforcement agency (LEA). The LEA intercepts a packet of a communication of a target UE and may provide either the entire packet to a KMS 16 or the STRP MKI field from the packet header. If the target of the LEA is the initiator 12, the LEA may also provide subscriber information (such as a name, phone number, etc.) or a device identifier (such as a hardware MAC address of a network interface) to the KMS 16 to identify the initiator UE 12 so that the KMS 16 can correctly select the appropriate secret key $S_A$ to regenerate the RANDRI. Alternatively, the subscriber information may be provided as a bit value in the MKI field that identifies the initiator UE 12 as described above. The one or more values use to generate the TGK may include the nonce value, a CS ID, the TGK and the subscriber information described above.

Figure 7:
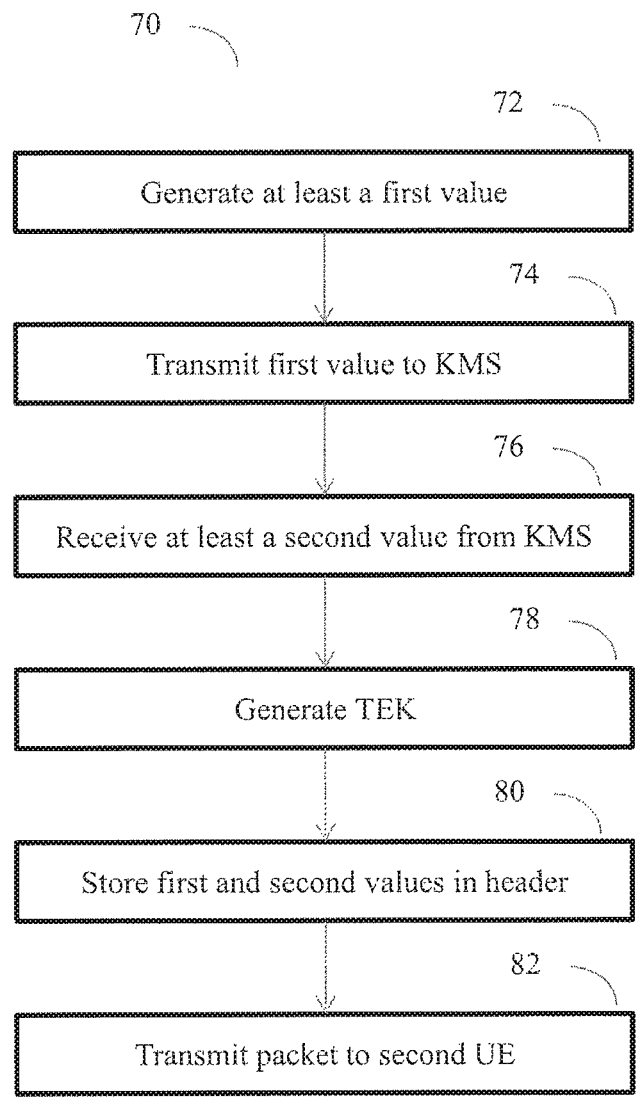
FIG. 7 shows in a flow diagram an example of a method for enabling lawful access to a secure communication, in accordance with an embodiment of the present disclosure.

FIG. 7 shows in a flow diagram an example of a method for enabling lawful access to a secure communication (70), in accordance with an embodiment of the present disclosure. The method (70) comprises a first UE generating at least a first value (72) used in generation of an encryption key. Next, the first value is transmitted to a KMS equipment (74). At least a second value is then received from the KMS equipment (76). This second value is also used in the generation of the encryption key. The TEK is regenerated using the first and second value (78). The first value and the second value are stored in a header of a packet (80). The data portion of the packet may be encrypted using the encryption key. Next, the packet is transmitted in a communication to a second UE (82). The first value may be the RANDRi generated by the first UE. The second value may be the TGK generated by the KMS equipment. The encryption key is the TEK generated by a function involving the RANDRi and the TGK.

Figure 9:
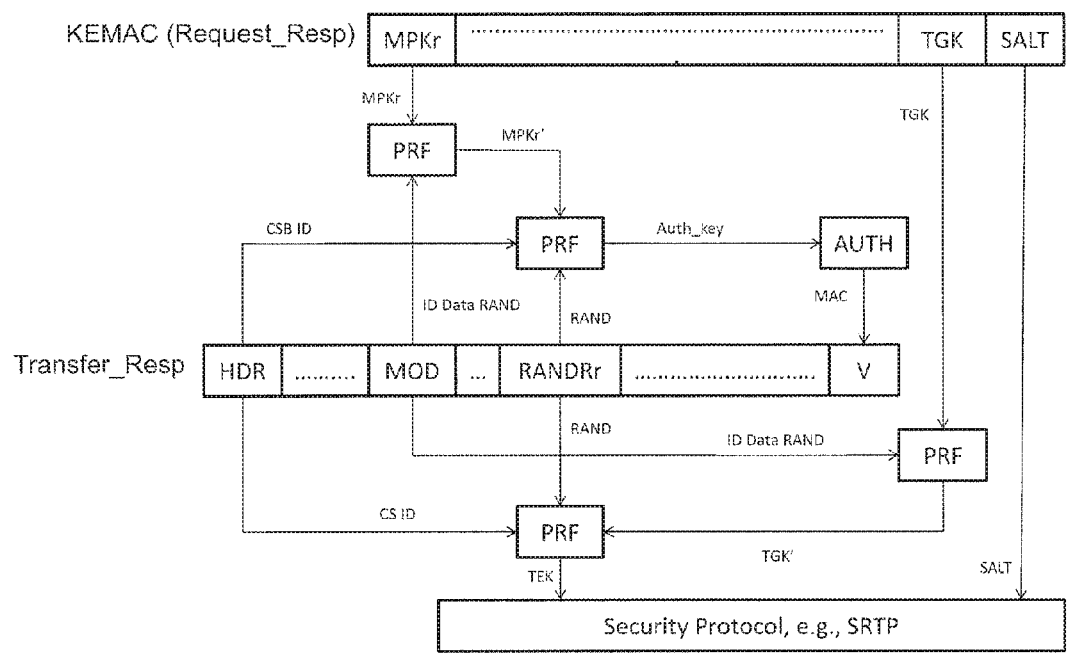
FIG. 9 illustrates, in a key hierarchy diagram, an example of key hierarchy with forking and RANDr, in accordance with the MIKEY-TICKET protocol.

FIG. 9 shows, in a key hierarchy diagram, an example key hierarchy for MIKEY-TICKET with forking and RANDRr, in accordance with an embodiment of the present disclosure. In addition to the inter-relationship of the various parameters shown, the parameter RANDRi is also used as an input for pseudo-random functions (PRF). However, this detail is omitted for simplicity. Furthermore MOD is the tuple {IDRr, RANDRkms} and as shown, when combined with the TGK produces a related generating key TGK'. This inter-relationship indicates the multiple approaches by which the TEK can be generated. For example, the responder may generate the TEK by using the CS ID, RANDRi, RANDRr, and TGK' parameters. The initiator on the other hand may use the parameters CS ID, RANDRi, RANDRr, MOD and TGK. Important parameters and messages to be considered whatever approach is used in providing TEK and SALT for lawful interception are RANDRi, RANDRr, MOD, IDRi, IDRr, HDR, KEMAC, TGK, TGK', TRANSFER_INIT, TRANSFER_RESP, SALT, CS ID and TEK.

Figure 10:
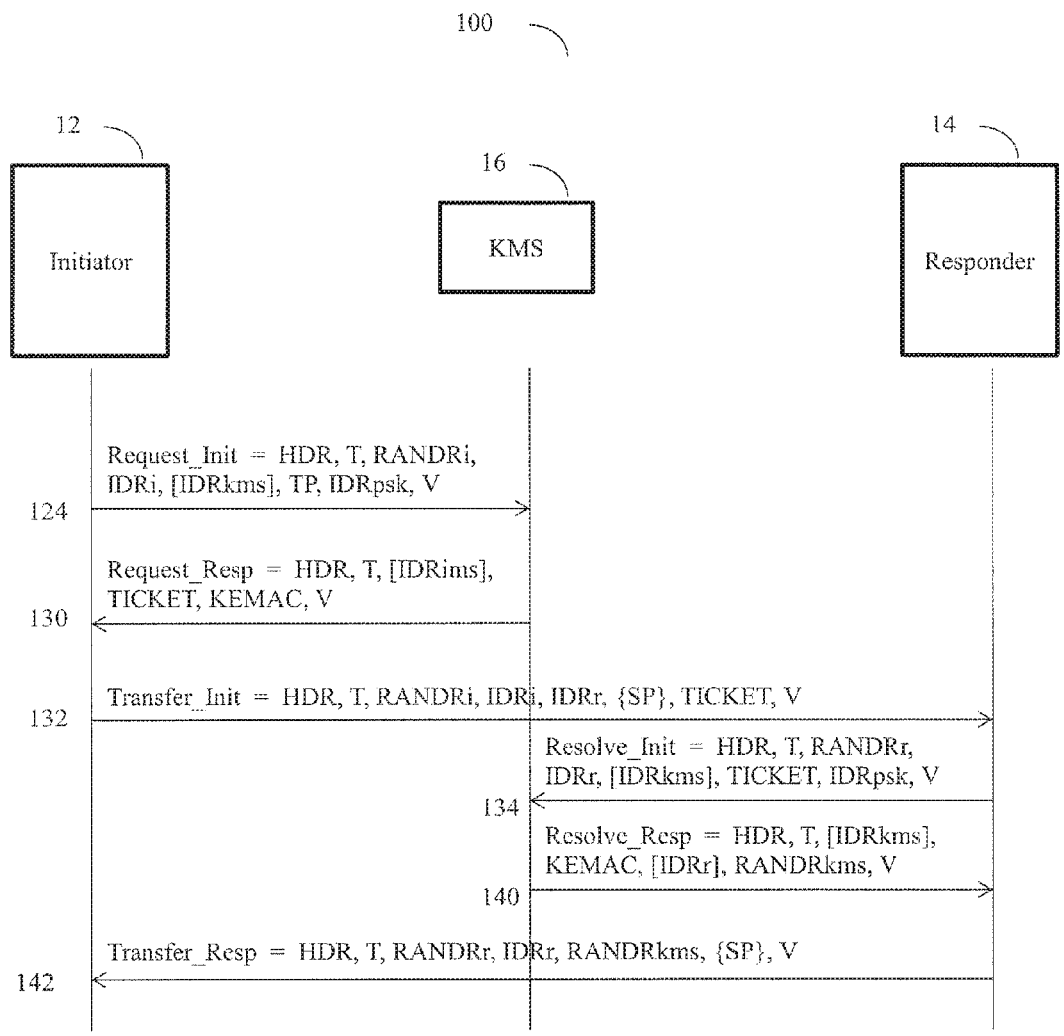
FIG. 10 illustrates, in a message flow diagram, an example of a key exchange between an initiator UE, a KMS and a responder UE using key forking, in accordance with the MIKEY-TICKET protocol.

FIG. 10 illustrates, in a message flow diagram (100), an example of a key exchange between an initiator UE 12 and a responder UE 14 using key forking, in accordance with the MIKEY-TICKET specification supported by the 3GPP specifications. In the first step (124), the Initiator 12 requests keying information and a ticket from the KMS 16. REQUEST_INIT (124) and REQUEST_RESP (130) signaling exchange perform this action.

Since the CS ID is contained in the HDR field and the TGK is contained in the KEMAC, once the REQUEST_RESP message (130) has been received the Initiator 12 has knowledge of the parameters CS ID, RANDRi and TGK. However the Initiator 12 is missing knowledge of the parameters MOD (or equivalently {IDRr, RANDkms}) and RANDRr necessary to generate TEK. Ultimately the Initiator 12 will receive these missing parameters in the TRANSFER_RESP message (142).

As a next step towards this goal, the Initiator 12 sends the TRANSFER_INIT message (132) to the Responder 14 containing the TICKET in addition to the CS ID (in the HDR) and RANDRi parameters. The Responder 14 then requests the KMS 16 to resolve the ticket by sending it a RESOLVE_INIT message (134). This message (134) contains not only the TICKET but also the CS ID (in the HDR), RANDRr parameter newly generated by the Responder 14 and IDRr or Responder's identity. Square brackets in FIG. 10 indicate fields that may be optional.

Once receiving the RESOLVE_INIT message (134), and randomly generating the parameter RANDRkms, the modifier MOD or modifier is (IDRr, RANDRkms) and can be generated by the KMS. After resolving the TICKET, the KMS 16 then generates the key TGK' from TGK and MOD. The KMS 16 then sends the RESOLVE_RESP (140) message to the Responder 14 containing the parameter RANDRkms and the key TGK' in the KEMAC field.

On reception of the RESOLVE_RESP message (140) the Responder 14 now has all the information necessary to generate the TEK. In detail, the Responder 14 has the CS ID and RANDRi from the TRANSFER_INIT (132), TGK' in the KEMAC field from the RESOLVE_RESP (140) and has itself generated RANDRr.

Moreover the Responder 14 also has the parameters missing by the Initiator 12 in the generation of TEK, namely RANDRr, RANDkms and IDRr. These are communicated to the Initiator in the TRANSDER_RESP message (142).

Figure 11:
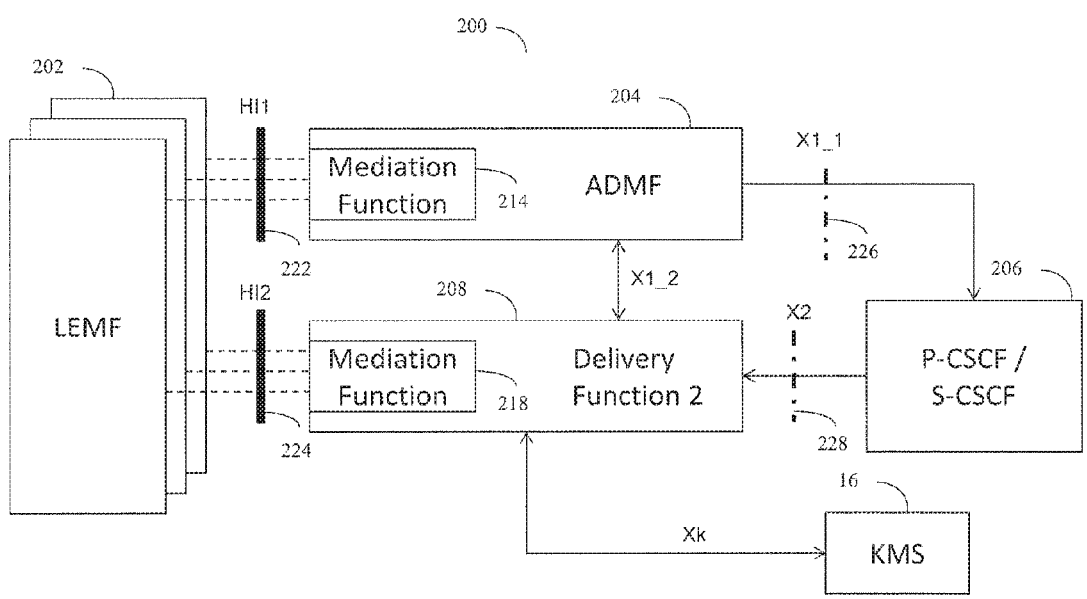
FIG. 11 illustrates, in a network component diagram, functionality used for lawful interception in the 3GPP implementation of MIKEY-TICKET.

FIG. 11 illustrates, in a network component diagram 200, functionality used for the lawful interception in the 3GPP implementation of MIKEY-TICKET as defined in section 7.A of TS 33.107. The ADMF 204 signals the target to the P-CSCF/S-CSCF 206 along the X1_1 interface 226 and to the delivery function 2 208. When lawful interception (LI) has been activated, the proxy/serving—call session control function (P/S-CSCF) 206 is instructed through the X1_1 interface 226 to forward all session initiation protocol (SIP) message events related to the target (could be the Initiator 12 or Responder 14) to the mediation function 218/delivery function 2 208 (MF/DF2) via the X2 interface 228. The MF/DF2 extracts the TRANSFER_INIT and TRANSFER_RESP messages and forwards them along with the public KMS identity of the target user to the KMS 16 via the Xk interface in a get_keys message. The get_keys message consists of the KMS identity of the target user, and the TRANSFER_INIT and TRANSFER_RESP messages. The KMS 16 regenerates the TEK and SALT keys used by the target user and returns them along with the CS ID to the MF/DF2 via Xk.

While the current lawful interception protocol detailed in FIG. 11 works in the case interception commences before the TRANSFER_INIT message is sent, if interception starts after this event then rekeying is required which is detectable both by the Initiator 12 and Responder 14.

An alternate approach would be to escrow the TEK session key or information with which the TEK can be regenerated along with the identity of the Initiator 12 and Responder 14 (IDRi and IDRr) and CS ID. Similarly the SALT (i.e., a random string of bits used as one of several inputs to a one-way function) can be cached directly or information with which the SALT can be regenerated can be cached. The cached information need not be co-located with the KMS 16 but should be accessible to the KMS 16. Furthermore the keying information may be extracted from the REQUEST_INIT and RESOLVE_INIT messages and parameters generated by the KMS 16 itself as opposed to the TRANSFER_INIT and TRANSFER_RESP messages.

Parameters used in the regeneration of the TEK can include the modifier MOD, Responder identity IDRr, RANDRr, RANDRi, CS ID, HDR, TGK and TGK'. Parameters used in the regeneration if the SALT can include the KEMAC.

Figure 12:
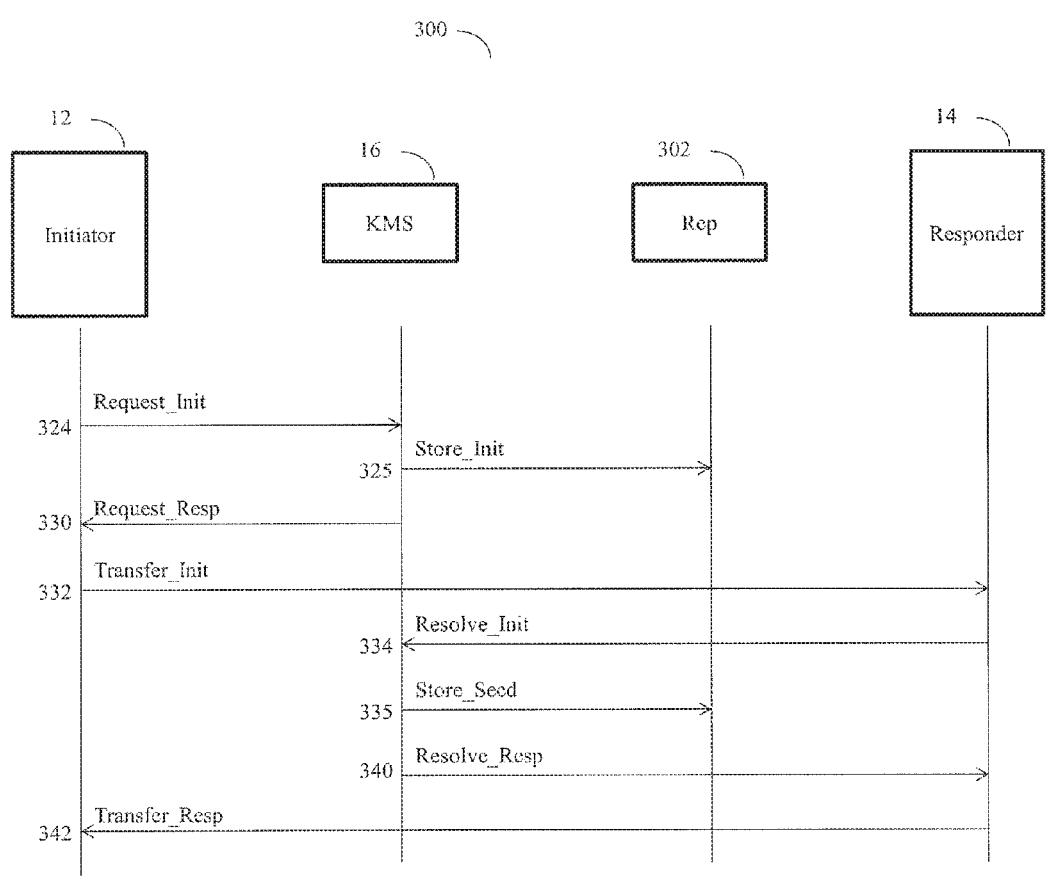
FIG. 12 illustrates, in a message flow diagram, an example of key caching during a MIKEY-TICKET protocol key exchange between an initiator UE, a KMS and a responder UE, in accordance with an embodiment of the present disclosure.

FIG. 12 illustrates, in a message flow diagram (300), an example of caching during a key exchange, in accordance with an embodiment of the present disclosure. Keying information is stored in a repository 302 labeled "Rep" and is signaled in an initial STORE_INIT event (325) and secondary STORE_SECD event (335). The repository 302 may or may not be the same entity as the KMS 16. In the case it 302 is a different entity the repository 302 may not be co-located with the KMS 16. The STORE_INIT event (325) results in the caching of the associated parameters IDRi, CS ID and may include other associated keying information such as RANDRi, SALT, IDRr, TGK and KEMAC. The STORE_SECD event (335) results in the caching of at least one of the following additional associated keying information parameters SALT, MOD, IDRr, TGK, TGK', RANDRkms, KEMAC and TEK. FIG. 12 shows two storing events, STORE_INIT, STORE_SECD. Alternatively, in another embodiment, the two storing events may be combined, for example by combining the two into the second event. Alternatively, a similar result may be achieved with multiple storing events.

A characteristic of this solution is the MF/DF2 can request the TEK, SALT and CS_ID used by the target from the KMS 16, without waiting for the TRANSFER_INIT (332) or TRANSFER_RESP (342) messages. This can be done either through a new message on the Xk interface from the MF/DF2 to the KMS 16 containing the target identity or by reusing the existing get_keys message with the KMS 16 ignoring the TRANSFER_INIT (332) and TRANSFER_RESP (342) portions. The target identity may include the initiator identity (IDRi) or responder identity (IDRr).

In order to provide an LEA with the context of the interception, in addition to returning the CS ID, TEK and SALT keys, the KMS 16 can also indicate whether interception commenced mid-call or at the start of the call.

A lawful interception occurs with judicial approval and should occur over an associated fixed time period. The fixed time period may be signaled to both the CSCF and the KMS 16. Signaling could consist of a start_interception message containing a timestamp explicitly detailing up to when lawful interception is allowed, or a validity period indicating how long lawful interception should occur after receipt of the start_interception message. A start_interception message on the Xk interface could consist of the get_keys message containing either a timestamp or validity period. Alternatively instead of signaling a time period, the halting of interception could be signaled by the ADMF to the CSCF and the KMS 16. The signaling could be a halt message containing the target user's ID and a message type indicator indicating the message is a halt_message.

Figure 13:
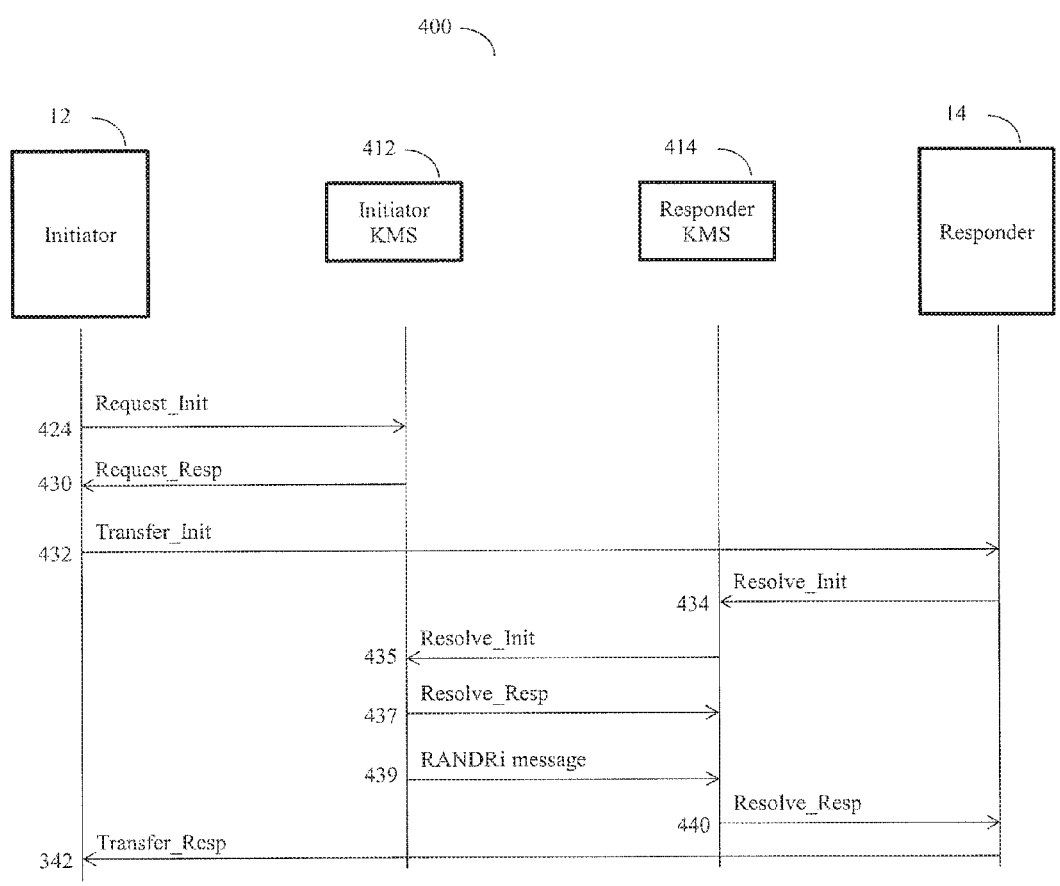
FIG. 13 illustrates, in a message flow diagram, an example of a key exchange between an initiator UE, an initiator's KMS, a responder's KMS and a responder UE using key forking, in accordance with an embodiment of the present disclosure.

FIG. 13 illustrates, in a message flow diagram 400, an example of a key exchange between an initiator UE 12, an initiator's KMS 412, a responder's KMS 414 and a responder UE 14 using key forking, in accordance with an embodiment of the present disclosure. When the Initiator 12 and Responder 14 have different KMSs 412,414, the MIKEY-TICKET protocol has the KMS 414 of the Responder 14 not to resolve the TICKET but to forward (435) the RESOLVE_INIT message (434) from the Responder 14 to the KMS 412 of the Initiator 12 and similarly to relay (440) the RESOLVE_RESP message (439) from the KMS 412 of the Initiator 12 to the Responder 14.

However, while the Initiator KMS 412 can escrow necessary information for lawful interception from the REQUEST_INIT and RESOLVE_INIT messages, the Responder KMS 414 does not have access to the REQUEST_INIT message (424). Therefore, as the Initiator KMS 412 has received the RANDRi parameter as part of the REQUEST_INIT message, the Initiator KMS 412 can regenerate the TEK by accessing or generating the parameters CS_ID, RANDRi, RANDRr and TGK', while the Responder KMS 414 does not have access to the parameter RANDRi in the current 3GPP implementation.

One approach would be to require the Responder 14 to communicate the RANDRi parameter either directly (not shown) to its KMS 414 or as an additional field in a modified RESOLVE_INIT message (not shown). However this may be undesirable as the Responder 14 could then become aware of a communication whose sole purpose is for lawful interception.

An alternate solution is to require the Initiator's KMS 412 to communicate at least one value associated with the RANDRi (439) (such as the RANDRi value itself, or a parameter containing or derived from RANDRi or containing RANDRi such as the REQUEST_INIT message) to the Responder's KMS 414. With the additional value associated with the RANDRi, the Responder's KMS 414 can then generate the TEK encryption key. Preferably, this communication (439) related to RANDRi is received by the Responder's KMS 414 before the Responder's KMS 414 forwards (440) the RESOLVE_RESP message (437) to the Responder 14. The RANDRi parameter could be appended to the RESOLVE_RESP message (437) or communicated in a separate message (439) either before or after the sending of the Resolve_Resp message (437). However, if the RANDRi parameter is appended, this appendage is preferably removed by the Responder's KMS 414 before transmission to the Responder 14. Information can be provided to (or received by) a KMS to obtain (i.e., generate) the RANDRi value. Alternatively, the RANDRi value maybe obtained (i.e., received by a KMS) via a communication. The communication of at least one value associated with the RANDRi includes the sending or receiving of the at least one value associated with the RANDRi, or the sending or receiving of the RANDRi value itself.

An alternative approach (not shown) to communicating the RANDRi parameter as a separate message could be for the Initiator's KMS 412 to forward the REQUEST_INIT message (424) to the Responder's KMS 414. Furthermore, in some modes of MIKEY-TICKET, the Initiator 12 reuses a TICKET. In such cases the Initiator 12 may generate a new RANDRi parameter but not communicate the new RANDRi value to the Initiator's KMS 412. In such cases, the Responder 14 can communicate the RANDRi or a parameter containing or derived from RANDRi to the Initiator's KMS 412. Methods by which this can be achieved include communicating a new message or appending the RANDRi to the REQUEST_INIT message.

Figure 8:
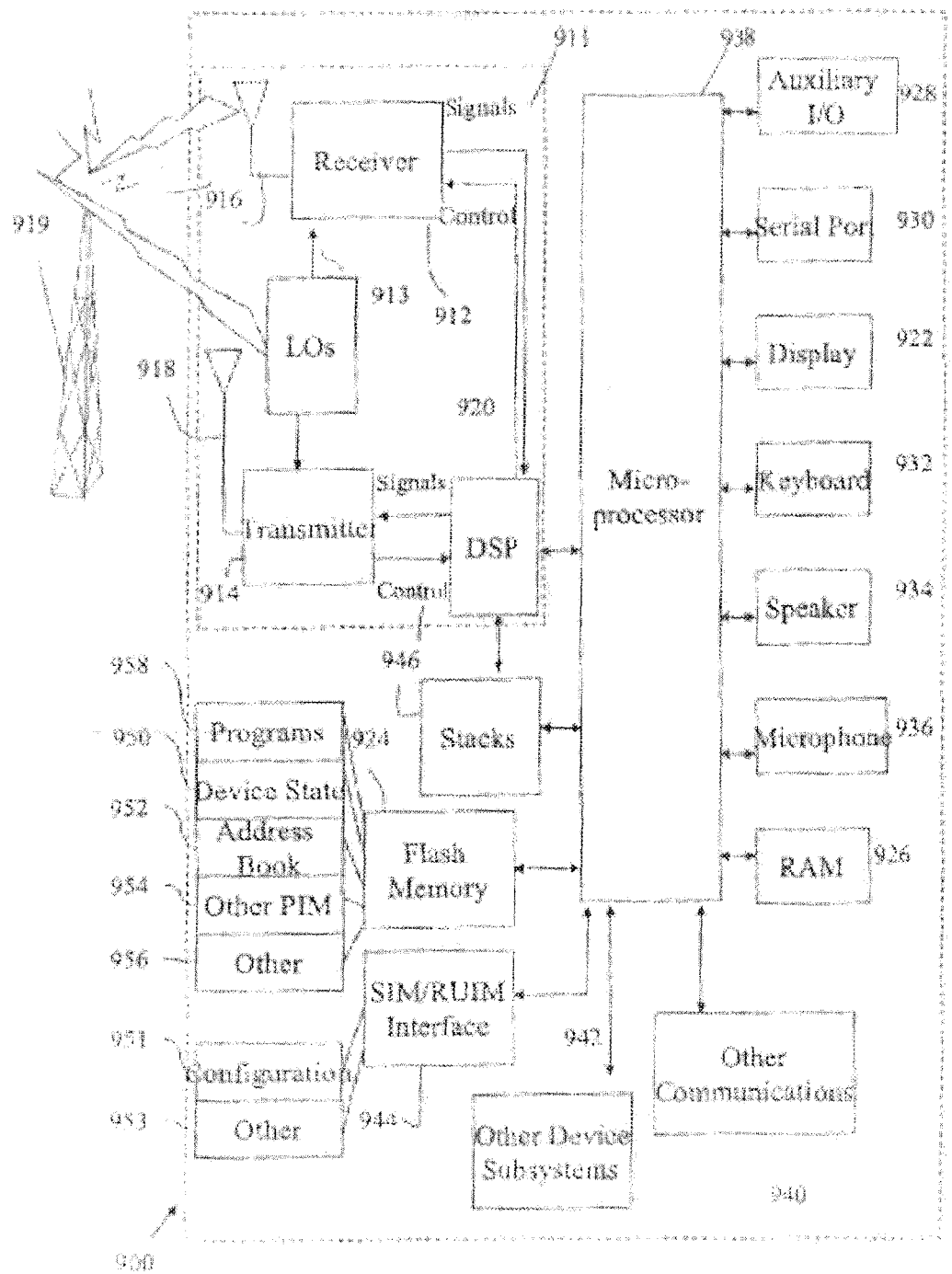
FIG. 8 is a block diagram illustrating a mobile device.

FIG. 8 is a block diagram illustrating a mobile device, which can act as a UE and co-operate with the apparatus and methods of FIGS. 1 to 7, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and processing means such as a processing module such as a digital signal processor (DSP) 20. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, EDGE network or LTE network.

Network access requirements will also vary depending upon the type of network 902. For example, in the Mobitex and DataTAC networks, mobile station 900 is registered on the network using a unique identification number associated with each mobile station. In LTE, UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 10, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes processing means such as a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 10 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 10, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

When mobile device 900 is used as a UE, protocol stacks 946 include apparatus and a method for a system and method of user equipment state transition.

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or MKS or other user equipment or access network components, a combination of multiple such components for example in communication with one another or a sub-network or full network of such components.

Embodiments have been described herein in relation to the MIKEY-TICKET specification. However the method and apparatus described are not intended to be limited to the specification or the versions thereof referred to herein but may be applicable to current and future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A call session control function (CSCF), comprising:
a memory; and
at least one hardware processor communicatively coupled with the memory and configured to:
receive a start_interception message from an administration function (ADMF) in a network node over a X1_1 interface, wherein the start_interception message indicates a starting time for an interception time period of a lawful interception;
in response to receiving the start_interception message, initiate a request to a key management service (KMS) to regenerate a key based on stored keying information, wherein the regenerated key is used to decrypt one or more intercepted packets during the interception time period; and
receive a halt_message from the ADMF, wherein the halt_message indicates that the lawful interception is to be stopped.

2. The CSCF of claim 1, wherein the halt_message includes a target user identifier.

3. The CSCF of claim 1, wherein the key is regenerated using at least one keying information included in a TRANSFER_INIT message.

4. The CSCF of claim 1, wherein the key is regenerated using at least one keying information included in a TRANSFER_RESP message.

5. The CSCF of claim 1, wherein the key is regenerated using at least one of RANDRi, RANDRr, Initiator's Identity (IDRi), Responder's Identity (IDRr), crypto session identity (CS ID), modifier (MOD), header payload (HDR), key data transport payload (KEMAC), traffic encryption key (TEK) generation key (TGK), or TEK generation key (TGK).

6. The CSCF of claim 1, wherein the halt_message is received over the X1_1 interface.

7. A non-transitory computer-readable medium containing instructions which, when executed, cause a computing device to perform operations comprising:
receiving, at a call session control function (CSCF), a start_interception message from an administration function (ADMF) in a network node over a X1_1 interface, wherein the start_interception message indicates a starting time for an interception time period of a lawful interception,
in response to receiving the start_interception message, initiating a request to a key management service (KMS) to regenerate a key based on stored keying information, wherein the regenerated key is used to decrypt one or more intercepted packets during the interception time period; and
receiving, at the CSCF, a halt_message from the ADMF, wherein the halt_message indicates that the lawful interception is to be stopped.

8. The non-transitory computer-readable medium of claim 7, wherein the halt_message includes a target user identifier.

9. The non-transitory computer-readable medium of claim 7, wherein the key is regenerated using at least one keying information included in a TRANSFER_INIT message.

10. The non-transitory computer-readable medium of claim 7, wherein the key is regenerated using at least one keying information included in a TRANSFER_RESP message.

11. The non-transitory computer-readable medium of claim 7, wherein the key is regenerated using at least one of RANDRi, RANDRr, Initiator's Identity (IDRi), Responder's Identity (IDRr), crypto session identity (CS ID), modifier (MOD), header payload (HDR), key data transport payload (KEMAC), traffic encryption key (TEK) generation key (TGK), or TEK generation key (TGK).

12. The non-transitory computer-readable medium of claim 7, wherein the halt_message is received over the X1_1 interface.

13. A method, comprising:
receiving, at a call session control function (CSCF), a start_interception message from an administration function (ADMF) in a network node over a X1_1 interface, wherein the start_interception message indicates a starting time for an interception time period of a lawful interception;
in response to receiving the start_interception message, initiating a request to a key management service (KMS) to regenerate a key based on stored keying information;
decrypting the one or more intercepted packets during the interception time period using the regenerated key; and
receiving, at the CSCF, a halt_message from the ADMF, wherein the halt_message indicates that the lawful interception is to be stopped.

14. The method of claim 13, wherein the halt_message includes a target user identifier.

15. The method of claim 13, wherein the key is regenerated using at least one keying information included in a TRANSFER_INIT message.

16. The method of claim 13, wherein the key is regenerated using at least one keying information included in a TRANSFER_RESP message.

17. The method of claim 13, wherein the key is regenerated using at least one of RANDRi, RANDRr, Initiator's Identity (IDRi), Responder's Identity (IDRr), crypto session identity (CS ID), modifier (MOD), header payload (HDR), key data transport payload (KEMAC), traffic encryption key (TEK) generation key (TGK), or TEK generation key (TGK).

* * * * *

UNITED STATES PATENT AND TRADEMARK OFFICE
CERTIFICATE OF CORRECTION

PATENT NO. : 9,871,827 B2  
APPLICATION NO. : 15/225543  
DATED : January 16, 2018  
INVENTOR(S) : Matthew John Campagna, Gregory Marc Zaverucha and Michael Eoin Buckley It is certified that error appears in the above-identified patent and that said Letters Patent is hereby corrected as shown below:

On the Title Page

Item (12), delete "Campagnan" and insert -- Campagna --, therefor.

Item (72), delete "Campagnan" and insert -- Campagna --, therefor.

Signed and Sealed this
Seventeenth Day of July, 2018

Andrei Iancu
*Director of the United States Patent and Trademark Office*